United States Patent [19]
Brooks et al.

[11] 4,073,800
[45] Feb. 14, 1978

[54] POLY-CARBONYLOXYURETHANES

[75] Inventors: John Langshaw Brooks; Richard Budziarek, both of Blackley, England

[73] Assignee: Imperial Chemical Industries Limited, London, England

[21] Appl. No.: 660,117

[22] Filed: Feb. 23, 1976

[30] Foreign Application Priority Data

Mar. 26, 1975 United Kingdom ............... 12677/75

[51] Int. Cl.$^2$ ........................................... C07C 125/06
[52] U.S. Cl. .................................. 260/404.5; 526/19; 526/20; 526/30; 526/52; 560/22; 560/29; 560/30; 560/31; 560/32; 560/33; 560/144; 560/162; 560/164; 560/165; 560/166
[58] Field of Search ........... 260/482 C, 479 C, 471 C, 260/404.5

[56] References Cited
PUBLICATIONS

Nery, J. Chem. Soc. (c), pp. 1860–1864, (1969).

Carpino, J.A.C.S., 81, pp. 955–957.

*Primary Examiner*—James O. Thomas, Jr.
*Assistant Examiner*—Michael Shippen
*Attorney, Agent, or Firm*—Cushman, Darby & Cushman

[57] ABSTRACT

Poly-carbonyloxyurethanes of the formula:

$$A\text{\textendash}[O\text{\textendash}CO\text{\textendash}NH\text{\textendash}O\text{\textendash}CO\text{\textendash}R]_n \quad (1)$$

wherein A is a linking group to which the oxygen atoms are attached at alkyl, cycloalkyl or aryl carbon atoms, $n$ is an integer of value at least 2, and each R which may be the same or different, is the residue of a monobasic carboxylic acid of formula R—COOH, and their salts, especially salts with cations based on teritary amines, are useful cross-linking or chain-extending agents for natural or synthetic polymers, or may be used as adhesives for binding these materials to each other or to metal substrates.

7 Claims, No Drawings

POLY-CARBONYLOXYURETHANES

This invention relates to nitrogen-containing compounds and more particularly to poly-carbonyloxyurethanes and their salts, and to their use as cross-linking and bonding agents for polymers.

According to the invention there are provided poly-carbonyloxyurethanes of the formula:

$$A + O—CO—NH—O—CO—R]_n \quad (1)$$

wherein A is a linking group to which the oxygen atoms are attached to alkyl, cycloalkyl or aryl carbon atoms, $n$ is an integer of value at least 2, and each R which may be the same or different, is the residue of a monobasic carboxylic acid of formula R—CO—OH.

The invention also provides salts of these poly-carbonyloxyurethanes of the formula:

$$A + O—CO—\overline{N}—O—CO—R]_n (B^{m+})_{n/m} \quad (2)$$

where B is a cation of valency $m$.

As linking groups represented by A there may be mentioned alkylene groups such as ethylene, 1,2- and 1,3-propylene, tetramethylene, hexamethylene, octamethylene, decamethylene, and dodecamethylene; cycloalkylene such as 1,4-cyclohexylene; arylene such as m- and p-phenylene; alkarylene groups derived from combinations of the foregoing groups such as methylene-bis-4-phenyl-, 2,2-propylene-bis-4-phenyl-, m- and p-xylylene; groups derived from one or more of the foregoing groups linked by heteroatoms or groups containing heteroatoms, e.g., bis-(alkyleneoxy)-phenylene groups; or radicals derived from polyalkylene oxides such as polyethylene oxides, condensates of alkylene oxides with glycols and other compounds containing two or more hydroxyl groups such as glycerol, 1,4-bis-($\beta$-hydroxyethoxycarbonyl)benzene, mannitol, sorbitol and sucrose; unsaturated polyvalent groupings, e.g., as derived from pentaerythritol dialkyl ether, and polymeric chains to which the oxycarbonyl groups are attached directly or through pendant groups, as for example in addition polymers and copolymers of alkyl esters of acrylic or methacrylic acids in which the oxycarbonyl group is attached to the alkyl radical of the ester group.

The symbol R can represent the residue of any monobasic carboxylic acid, but preferably represents an optionally substituted alkyl or aryl group, e.g., alkyl groups preferably containing from 1 to 4 carbon atoms such as ethyl, n- and iso-propyl, n-butyl, and especially methyl, but also n-octyl, n-decyl, n-dodecyl and n-octadecyl, and substituted derivatives of these such as chloroethyl, trifluoromethyl and perfluorooctyl, and aryl groups such as phenyl and o-, m- and p-tolyl and substituted aryl especially substituted phenyl groups such as nitrophenyl, chloro-, bromo-, iodo and fluorophenyl and alkoxyphenyl, e.g., methoxyphenyl.

$n$ is preferably 2 or 3.

The preferred meaning for the radical A when $n$ is 2 is the class consisting of alkylene radicals of formula $(CH_2)_m$ where $m$ has a value of 2 to 10, phenylene, xylylene, or polyethyleneoxy radicals of the formula:

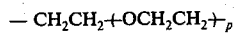
— $CH_2CH_2$—$(OCH_2CH_2)_p$— where $p$ is 1 or 2; and when $n$ is 3, the class consisting of tri(ethylene)amino and tri(methylenepropane).

The preferred meaning for the radical R is the class consisting of alkyl radicals of 1 to 17 carbon atoms, phenyl, dimethylaminophenyl, nitrophenyl, hydroxyphenyl, chlorophenyl and tolyl.

Thus, as preferred examples of formula (1) there may be mentioned:

1,4-bis-[N-(benzoyloxy)carbamoyloxy]-butane
1,4-bis-[N-(p-nitrobenzoyloxy)carbamoyloxy]-butane
1,4-bis-[N-(octanoyloxy)carbamoyloxy]-butane
1,4-bis-[N-(acetyloxy)carbamoyloxy]-butane
1,4-bis-[N-(4-dimethylaminobenzoyloxy)carbamoyloxy]-butane
1,4-bis-[N-(4-toluoyloxy)carbamoyloxy]-butane
1,4-bis-[N-(3-nitrobenzoyloxy)carbamoyloxy]-butane
di-$\beta$-[N-(benzoyloxy)carbamoyloxy]ethyl ether
di-$\beta$-[N-(acetyloxy)carbamoyloxy]ethyl ether
1,2-bis-[N-(benzoyloxy)carbamoyloxy] ethane
1,2-bis-[N-(3-chlorobenzoyloxy)carbamoyloxy] ethane
1,2-bis-[N-(2-hydroxybenzoyloxy)carbamoyloxy] ethane
1,2-bis-[N-(stearoyloxy)carbamoyloxy] ethane
1,2-bis-[N-(dodecanoyloxy)carbamoyloxy] ethane
1,2-bis-[N-(4-ethoxycarbonylbenzoyloxy)carbamoyloxy] ethane
1,2-bis-[N-(benzoyloxy)carbamoyloxy] propane
1,2-bis-[N-(acetyloxy)carbamoyloxy] propane
1,10-bis-[N-(acetyloxy)carbamoyloxy] decane
1,3-bis-[N-(acetyloxy)carbamoyloxy] benzene
1,4-bis-[N-(benzoyloxy)carbamoyloxy] benzene
1,4-bis-[N-(benzoyloxy)carbamoyloxymethyl] benzene
1,4-bis-[N-(n-butyroyloxy)carbamoyloxymethyl] benzene
1,2-bis-[N-(acetyloxy)carbamoyloxyethoxy] ethane
1,1,1-tris-[N-(acetyloxy)carbamoyloxymethyl] propane
2,2',2''-tris-[N-(benzoyloxy)carbamoyloxy]triethylamine.

As examples of cations represented by B, there may be mentioned alkali metal cations, e.g., sodium and potassium; however these salts tend to decompose at the usual ambient temperatures and it is preferred that B should represent an organic cation, derived from primary, secondary and especially tertiary amines, e.g., thiouronium or diethylammonium, but preferably trialkylammonium salts as derived e.g., from tertiary amines such as triethylamine, dimethylbenzylamine, triethanolamine, pyridine, 1,4-diazabicyclo-2,2,2-octane, or other tertiary amino compounds such as tetraalkylthioureas, tetraalkylthiuram mono- and di-sulphides, and dialkyldithiocarbamates, especially zinc dialkyldithiocarbamate and benzthiazyl derivatives. As a general rule, it is preferred that the cation should be derived from an amino compound of low volatility at ambient temperatures, since these are more stable than either the alkali metal salts or the salts formed by volatile amino compounds. All the salts are thermally unstable, the instability being increased by the presence of electron withdrawing substituents, e.g., halogen atoms or nitro groups in the group R.

The invention also provides a process for manufacture of the poly-carbonyloxyurethanes of formula (1) which comprises reacting a poly-(hydroxyurethane) of the formula:

$$A + O—CO—NHOH]_n \quad (3)$$

with $n$ moles of the chloride, anhydride or lower alkyl ester of a carboxylic acid of the formula:

$$R - COOH \qquad (4)$$

the symbols A, R and $n$ having the meanings stated above; in the case of acid chlorides or anhydrides, the reaction should be carried out in the presence of an acid-binding agent which is added at a rate sufficient to neutralize the mineral acid formed whilst keeping the pH of the mixture below 7.

The above process can conveniently be carried out by mixing the poly-(hydroxyurethane) and the carboxylic acid anhydride or chloride, in an inert solvent, e.g., diethyl ether or dioxan, and adding the acid-binding agent at such a rate that the pH of the mixture is maintained at below 7. The reaction is preferably carried out at a temperature below 20° C more especially from 0° to 5° C.

Excess of the carboxylic acid anhydride or chloride should be avoided, since otherwise a further reaction may take place whereby carbon-acylation of the imino group is effected. This reaction can also take place in preference to reaction with the hydroxyl group if the pH of the mixture is allowed to rise to 7 or above.

As examples of acid-binding agents which can be used in the above process there may be mentioned alkali metal carbonates, bicarbonates and hydroxides, but more especially tertiary amines, e.g., trialkylamines, tris-(hydroxyalkyl)amines, pyridine or its homologues. As particular examples of all these, there may be mentioned:
sodium and potassium bicarbonates, carbonates and hydroxides triethyl- and tri-n-butyl-amines,
triethanolamine
1,4-diaza-2,2,2-bicyclooctane
N-methylpiperidine
quinoline and the picolines
2-mercaptobenzthiazole and bis(2'-benzthiazolyl)disulphide.

Performance of the process using an ester of the acid R—COOH can be effected by conventional transesterification methods, e.g., by heating a mixture of the ester and the poly(hydroxyurethane) to a temperature above the boiling point of the lower alkanol produced.

As examples of acids whose chlorides, anhydrides, or lower alkyl (i.e., $C_1 - C_4$) esters may be used in the above process, there may be mentioned:
acetic acid
propionic acid
butyric acid
octanoic acid
stearic acid
benzoic and p-toluic acids
o-, m- and p-hydroxybenzoic acids, and
o-, m- and p-nitrobenzoic acids.

The poly-(hydroxyurethanes) of formula (3) used in the above process can be obtained by reacting a polyol of the formula $A(OH)_n$ with excess phosgene to form a poly-chloroformate of the formula $A(O—COCl)_n$ and reacting the latter with hydroxylamine.

As examples of polyols of formula $A(OH)_n$ which may be used, there may be mentioned: aliphatic glycols and higher polyols, e.g., ethylene glycol and diethylene glycol,
1,2- and 1,3-propylene glycols
1,4-, 1,3- and 2,3-butylene glycols
hexamethylene glycol
glycerol
trimethylolethane
trimethylolpropane
pentaerythritol
araliphatic glycols, e.g.,
m- or p-xylylene glycols
di-($\beta$-hydroxyethyl)hydroquinone;
polyethers formed by the addition of alkylene oxides of 2-4 carbon atoms, e.g., ethylene oxide, propylene oxide or tetrahydrofuran, on aliphatic or araliphatic polyols as described above, or on aromatic polyols e.g., hydroquinone, catechol, resorcinol or carbohydrate polyols, e.g., glucose, fructose, sorbitol, mannitol, sucrose;
polyesters formed by the esterification of di- or polycarboxylic acids e.g., adipic or phthalic acid, with aliphatic glycols or higher polyols of the kinds described above, especially $\beta$-hydroxyethyl terephthalates; hydroxyl-ended polyolefins, e.g., polyethylene or polypropylene containing terminal OH groups, addition polymers of ethylene compounds containing a hydroxyl group, e.g., polyvinyl alcohol, poly-$\beta$-hydroxyethyl acrylate or poly-$\beta$-hydroxyethylmethacrylate.

The poly-carbonyloxyurethanes of the invention are oils or solids, depending on the values of A, R and $n$, soluble in many organic solvents. They may be converted to the salts of formula (2) by treatment with a suitable basic compound, containing the cation $B^+$.

The poly-carbonyloxyurethane salts of the invention may be used as cross-linking agents for polymers, as chain extending agents for, e.g., polyepoxides and other polyfunctional compounds, as bonding agents and adhesives for use with polymers or other materials, and as coating agents. As polymers which may be cross-linked there may be mentioned natural rubber, synthetic rubbers such as styrene-butadiene (SBR), acrylonitrile-butadiene, ethylene-propylene rubbers (EPDM), stereo-regular polyisoprene, high or low density polyethylene, polypropylene, nylons, polyesters and polyurethanes. Any of the above polymers for example styrene-butadiene rubber may be bonded to the same polymer, or a different polymer as for example stereoregular polyisoprene, or to other materials such as polyethylene terephthalate, nylon-6, nylon-6,6, rayon and metal substrates such as copper, brass and steel, by means of the poly-carbonyloxyurethane salts of the invention.

The poly-carbonyloxyurethane salts may be incorporated into the polymer by for example blending with the polymer in any conventional manner, such as on a two-roll mill, this type of procedure being especially suitable when the poly-carbonyloxyurethane salt is to be used as a cross-linking agent and must be present throughout the bulk of the polymer. The polymer is thereafter shaped, for example in a mould, and heated to a temperature above 50° C, and preferably between 100° and 250° C, to bring about cross-linking. The salt may be pre-formed and added to the polymer or may be formed in situ by adding a poly-carbonyloxyurethane of formula (1) and at least an equivalent weight of a basic compound providing the cation $B^+$.

For use as a bonding agent or adhesive, in which cases application of the poly-carbonyloxyurethane salt is usually necessary only at the surfaces of the polymer, it is generally more convenient and economical to treat the polymer in shaped form, e.g., in filament, yarn, fabric, sheet or massive form, with the poly- carbonyloxyurethane and basic compound in solution form, and then heat the treated polymer to drive off the solvent, bring the surfaces to be bonded, e.g., polyester cord and rubber, into contact, and then heat more strongly to effect bonding. An auxiliary bonding agent such as an epoxy resin and resorcinol/formaldehyde reaction product may also be present to aid adhesion.

As basic compounds which may be used in conjunction with the poly-carbonyloxyurethanes in polymers there may be mentioned any of the basic compounds used to form salts of the poly- carbonyloxyurethanes. Volatile amines may have the disadvantage of causing porosity in polymers treated in the mass, and non-volatile amino compounds are more suitable for this purpose. Certain amines, such as tetramethylthiourea or the tetramethylthiuram monosulphides and disulphides and various dialkyldithiocarbamates, which are commonly used as vulcanisation accelerators may be more suitable for this purpose, especially for use in rubber.

It is most convenient to add the poly-carbonyloxyurethane and basic compound independently to the polymer but similar effects may be obtained by mixing the poly-carbonyloxyurethane and basic compound together before addition or to react them to form the salt. The last two procedures however may have the disadvantage that the mixture or the salt may not be stable to storage.

The amount of basic compound is suitably equimolar to that of the carbonyloxyurethane groups present in the poly-carbonyloxyurethane added, but less or more may be used if desired.

The uses of the poly-carbonyloxyurethanes described above and polymers so treated represent further features of the invention.

The invention is illustrated but not limited by the following Examples in which all parts and percentages are by weight unless otherwise stated.

EXAMPLE 1

A solution of 360 parts of 1,4-butanediol in 200 parts of chloroform is added over 2 hours to a stirred solution of 900 parts of phosgene in 500 parts of methylene dichloride at a temperature of 0° C under a reflux condenser cooled with solid carbon dioxide. The reaction mixture is then stirred at 5° C for 2 hour and at 25° C for 3 hours after which the condenser is removed and a stream of dry nitrogen is passed to remove hydrogen chloride and excess phosgene. The methylene dichloride and chloroform are distilled off under reduced pressure and 850 parts of 1,4-butane bis-chloroformate are obtained by distillation at 97° C under a pressure of 1 mm of mercury. On analysis the compound was found to contain carbon 34.1%, hydrogen 4.1% and chlorine 32.7%, the theoretical figures being carbon 33.5%, hydrogen 3.7% and chlorine 33.0%.

A solution of 276.4 parts of potassium carbonate in 250 parts of water and 215 parts of 1,4-butane bis-chloroformate are added separately at equivalent rates over 1 hour to a stirred suspension of 139 parts of finely ground hydroxylamine hydrochloride in 700 parts of diethyl ether at a temperature between 0° and 5° C. After a further 3 hours stirring at 0° C and 18 hours at 25° C the suspension is filtered and the filter cake washed with water until free from chloride. 170 parts of butane-1,4-bis-N-hydroxycarbamate, a white solid melting at 150° C, are obtained. On analysis the compound was found to contain carbon 35.5%, hydrogen 5.9% and nitrogen 13.0%, the theoretical figures being carbon 34.6%, hydrogen 5.8% and nitrogen 13.5%.

A mixture of 41.6 parts of butane-1,4-bis-N-hydroxycarbamate, 62.4 parts of benzoyl chloride and 200 parts of dioxan is stirred at a temperature of 0°–5° C while a solution of 40.4 arts of triethylamine in 50 parts of dioxan is added over about 1½ hours at such a rate that the pH is maintained between 3 and 6. After a further 24 hours stirring at a temperature of 25° C the mixture is added to 1000 parts of 5% aqueous sodium chloride solution. The white solid is separated off, washed with water, dissolved in 300 parts of hot toluene and the solution is dried over magnesium sulphate, filtered and cooled to give 32 parts of 1,4-bis-[N-(benzoyloxy)carbamoyloxy]-butane, as colourless crystals melting at 120° C. Found: C = 55.2%, H = 4.3%, N = 6.3%. $C_{20}H_{20}O_8N_2$ requires C = 55.7%, H = 4.8%, N = 6.7%.

EXAMPLE 2

4 parts of the product of Example 1 was milled into 100 parts of a 27:73 styrene-butadiene copolymer (SBR) at 50°–60° C to give a pale yellow sheet. The compounded rubber sheet was cured at 190° C for 15 minutes to give a cross-linked rubber in which the maximum modulus torque recorded by Oscillating Disc Rheometer was 40 units, vs. 17 for the untreated rubber after 54 minutes cure. Similar treatment of ethylene-propylene copolymer using a mixture of 4 parts of the product of Example 1 and 3 parts of tetramethylthiuram mono-sulphide gave a maximum torque modulus 38 vs. "no cure" for the untreated rubber. Treatment of 100 parts of SBR rubber in a similar way with a mixture of 4.16 parts of the product of Example 1 and 2.02 parts of triethylamine gave a product of peak torque 52 after 13 minutes at 200° C and giving 6 times the elongation at break of cured, untreated SBR rubber.

EXAMPLE 3

Rubber masterbatches based on Styrene/Butadiene Rubber (SBR) and Ethylene/Propylene Rubber (EPDM), as detailed below, are prepared by mixing the ingredients together in a BR size Banbury mixer.

|  | MB/1 | MB/2 |
|---|---|---|
| Styrene/butadiene rubber (Solprene 1204) | 100 | — |
| Ethylene/propylene rubber (Intollen 155) | — | 100 |
| N-330 Carbon Black | 50 | 50 |
| (Figures quoted are parts by weight) | | |

To separate portions of each of the masterbatches the product of Example 1 is added on a laboratory mill. The product is evaluated both with and without zinc diethyldithiocarbamate (ZDC). Test pieces are vulcanised at 150° C for the times given in Table 1. The properties of the vulcanizates are then measured. Full details of the amounts used and the test results obtained are given in Table 1. Conventional curing systems are included for comparison.

EXAMPLE 4

Repetition of the process of Example 1 using p-nitrobenzoyl chloride instead of benzoyl chloride gives 1,4-bis-[N-(nitrobenzoyloxy) carbamoyloxy]butane, a yellow solid m.p. 174° C. Found: C = 45.9%, H = 3.3%, N = 10.6%. Theory for $C_{20}H_{18}O_{12}N_4$ is C = 47.5%, H = 3.6%, N = 11.1%.

Repetition of the procedure of Example 2 using 3 parts of tetramethylthiuram monosulphide and 4 parts of the above product in 100 parts of 27:73 styrene-butadiene copolymer gave a cross-linked rubber in which the extension at break was 6 times that of the untreated rubber. The maximum torque modulus recorded by Oscillating Disc Rheometer was 29 units vs. 17 for the untreated rubber.

with maximum torque modulus of 36 vs. "no cure" for the untreated rubber.

EXAMPLE 8

Repetition of the process of Example 1 using octanonyl chloride instead of benzoyl chloride at the last stage gives 1,4-bis-[N-(octoyloxy)carbamoyloxy]-butane, a colorless wax. Found: C = 57.1%, H = 8.6%, N =

TABLE 1

| Mix No. | 1 | 2 | 3 | 4 | 5 | 6 |
|---|---|---|---|---|---|---|
| MB/1 | 150 | 150 | 150 | — | — | — |
| MB/2 | — | — | — | 150 | 150 | 150 |
| Product of Example 1 | 4 | 4 | — | 4 | 4 | — |
| Zinc diethyldithiocarbamate (ZDTC) | — | 4 | — | — | 4 | — |
| 2-mercaptobenzthiazole | — | — | — | — | — | 1.0 |
| Tetramethylthiuram monosulphide | — | — | — | — | — | 1.5 |
| N-cyclohexyl benzthiazyl sulphenamide | — | — | 1.2 | — | — | — |
| Sulphur | — | — | 1.8 | — | — | 1.5 |
| Rheometer at 150° C | | | | | | |
| Induction time T$_2$ (minutes) | 6.3 | 2.3 | 6.9 | 6.7 | 2.4 | 2.0 |
| Peak torque (m.lbs.) | 90 | 63 | 114 | 39 | 66 | 179 |
| Time to 95% Cross linking (minutes) | 30 | 10 | 20 | — | 30 | 20 |
| Physical Properties of test pieces cured as for 95% cross linking | | | | | | |
| Tensile strength (kg/cm$^2$) | 141 | 201 | 183 | — | 276 | 188 |
| Elongation at break (%) | 200 | 460 | 280 | — | 405 | 155 |
| Modulus at 200% elongation (kg/cm$^2$) | — | 60 | 119 | — | 86 | — |
| Hardness (BS°) | 71 | 67 | 71 | — | — | — |
| Compression set % (24 hours at 100° C) | 23 | 31 | 43 | — | 31 | 29 |

EXAMPLE 5

Repetition of the process of Example 1 using diethylene glycol instead of 1,4-butane diol gives di-β-[N-(benzoyloxy) carbamoyloxy]ethyl ether, a pale yellow oil. Found: C = 56.4%, H = 4.8%, N = 6.5%. $C_{20}H_{20}O_9N_2$ requires: C = 55.6%, H = 4.6%, N = 6.5%.

Repetition of the procedure of Example 2 using 4 parts of the above product in 100 parts of 27:73 styrene-butadiene copolymer gave a cross-linked rubber in which the elongation to breaking point was 3 times that of the untreated rubber.

EXAMPLE 6

Repetition of the process of Example 1 using ethylene glycol instead of 1,4-butane diol gives 1,2-bis-[N-(benzoyloxy)carbamoyl)oxy] ethane, a colorless oil. Found: C = 55.4%, H = 4.1%. $C_{18}H_{16}O_8N_2$ requires C = 55.6%, H = 4.1%.

Repetition of the procedure of Example 2 using 4 parts of the above product in 100 parts of 27.73 styrene:-butadiene copolymer gave a cross linked rubber for which the maximum torque modulus recorded by Oscillating Disc Rheometer was 34 units vs. 17 for the untreated rubber.

EXAMPLE 7

10.4 parts of the product of Example 1 and 5.05 parts of triethylamine are stirred in 100 parts of ethyl alcohol at 25° C to give a clear solution. The alcohol is then distilled off under reduced pressure to give 9 parts of a yellow solid m.p. 92° C.

Repetition of the procedure of Example 2 using 6 parts of the above product in 100 parts of 27:73 styrene:-butadiene copolymer gave a cross linked rubber in which the extension to break was 5 times that of the untreated rubber. The maximum torque modulus recorded by Oscillating Disc Rheometer was 52 units vs. 17 for the untreated rubber. Similar treatment of ethylene-propylene copolymer gave a cross linked rubber 5.8%. $C_{22}H_{40}O_8N_2$ requires C = 57.4%, H = 8.7%, N = 6.1%.

The above product was tested in SBR rubber using the method of Example 3. The following results were obtained:

| | peak torque modulus | Induction time | Time to 95% peak torque |
|---|---|---|---|
| Standard | 106 | 1.4 | 3.5 |
| Above product | 110 | 2.4 | 10 |

Repetition of the process of Example 1 using acetyl chloride instead of benzoyl chloride at the last stage gives 1,4-bis-[N-(acetyloxy)carbamoyloxy]butane, a white crystalline solid m.p. 96° C. Found: C = 40.7%, H = 6.3%, N = 10.0%. $C_{10}H_{16}O_8N_2$ requires C = 41.2%, H = 5.5%, N = 9.6%.

The above product was tested in SBR rubber using the method of Example 3. The following results were obtained:

| | Peak torque | Induction time | Time to 95% peak torque |
|---|---|---|---|
| Standard | 106 | 1.4 | 3.5 |
| Above product | 78 | 0.6 | 1.5 |

We claim:

1. A poly-carbonyloxyurethane of the formula:

$$A + O-CO-NH-O-CO-R]_n \qquad (1)$$

wherein n is 2 or 3, A is a linking group to which the oxygen atoms are attached through carbon atoms, A being selected from the class consisting of alkylene radicals of formula $(CH_2)_m$ where m has a value of 2 to 10, phenylene, xylylene, and polyethyleneoxy radicals of the formula:

$$-CH_2CH_2+OCH_2CH_2+_p$$

where p is 1 or 2 when n is 2 and A being selected from the class consisting of tri(ethylene)amino and tri(methylenepropane) when n is 3, and each R, which may be the same or different, is selected from the class consisting of alkyl radicals of 1 to 17 carbon atoms, phenyl, dimethylaminophenyl, nitrophenyl, hydroxyphenyl, chlorophenyl and tolyl.

2. A poly-carbonyloxyurethane as in claim 1, said poly-carbonyloxyurethane being 1,4-bis-[N-(octoyloxy) carbamoyloxy]-butane, of the formula

3. A poly-carbonyloxyurethane as claimed in claim 1, said compound being 1,4-bis-[N-(benzoyloxy) carbamoyloxy]-butane.

4. A poly-carbonyloxyurethane as claimed in claim 1, said compound being 1,4-bis-[N-(nitrobenzoyloxy) carbamoyloxy]butane.

5. A poly-carbonyloxyurethane as claimed in claim 1, said compound being di-β-[N-(benzoyloxy) carbamoyloxy]ethyl ether.

6. A poly-carbonyloxyurethane as claimed in claim 1, said compound being 1,2-bis-[N-(benzoyloxy) carbamoyl)oxy]ethane.

7. A poly-carbonyloxyurethane as claimed in claim 1, said compound being 1,4-bis-[N-(acetyloxy) carbamoyloxy]butane.

* * * * *